Dec. 15, 1970  R. W. MOZER  3,548,050
METHOD OF MAKING RESIN FACED METAL MOLDING DIES
Filed April 28, 1967  2 Sheets-Sheet 1

INVENTOR
RUDOLF W. MOZER
BY
Barnes, Kisselle, Raisch & Choate
ATTORNEYS

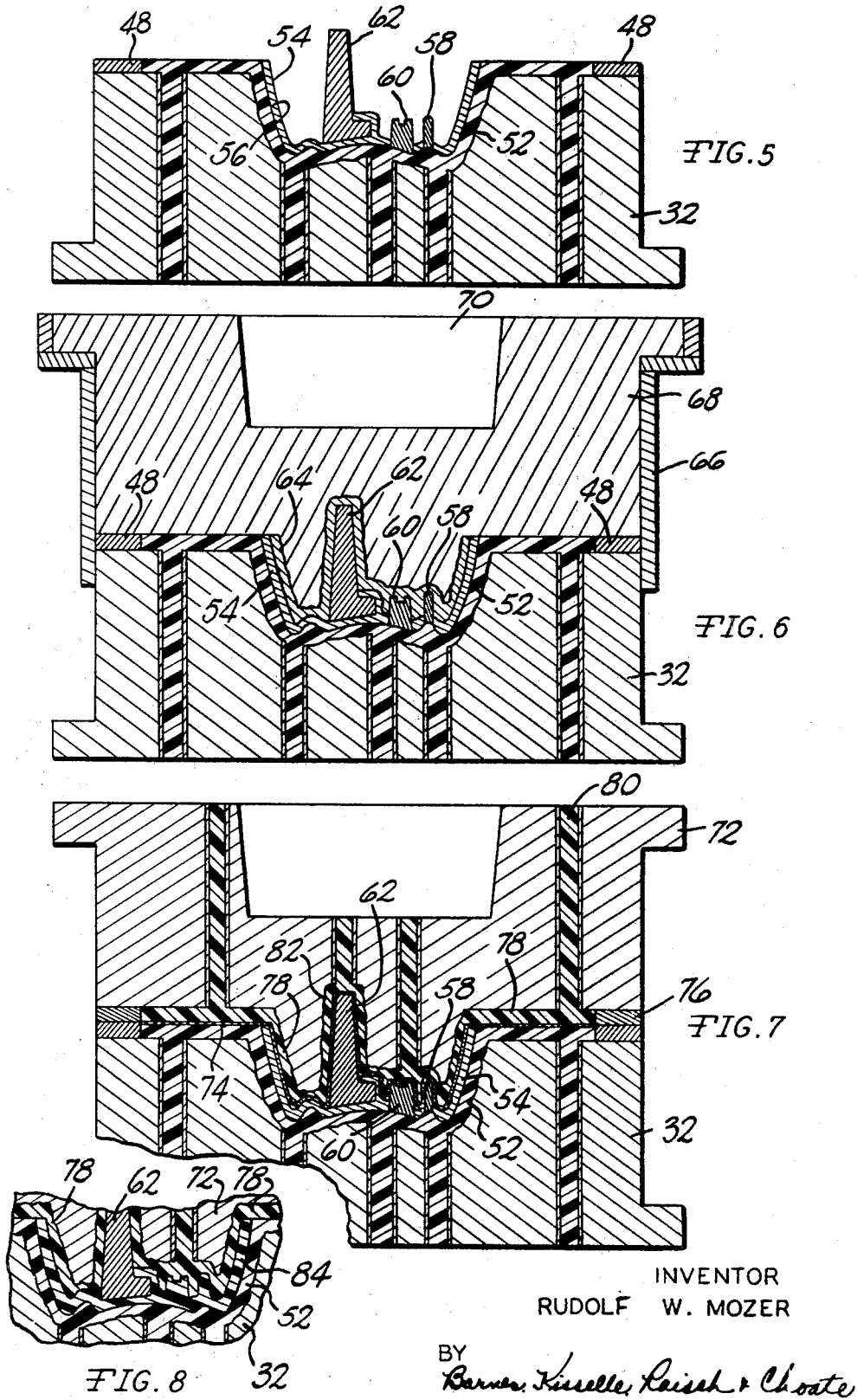

United States Patent Office 3,548,050
Patented Dec. 15, 1970

3,548,050
METHOD OF MAKING RESIN FACED METAL MOLDING DIES
Rudolf W. Mozer, Bloomfield Hills, Mich., assignor to Delta Pattern and Model Company, Warren, Mich., a corporation of Michigan
Filed Apr. 28, 1967, Ser. No. 634,732
Int. Cl. B29c 1/02
U.S. Cl. 264—227    6 Claims

ABSTRACT OF THE DISCLOSURE

Method of preparing resin faced metal dies. A metal female die is cast from a model and the die is faced with epoxy resin by injecting said resin between the die and the model under conditions such that the resin adheres to the face of the female die but is separable from the model. The metal male die is cast by using the female die as an initial pattern and is faced with resin by injecting epoxy between the male and female dies under conditions such that the resin adheres to the male die but is separable from the female die.

---

This invention relates to the method of making a die for forming a workpiece by injection molding or the like. Generally speaking the method of this invention includes the steps of making male and female die sections which, if assembled, would provide a cavity therebetween larger in size than the part to be molded. A plastic material, namely an epoxy resin, is cast as a layer between a model of the part and the cavity face of one of the die sections so that the cavity is faced with a layer of resin. The two die sections are then assembled and a layer of resin is cast against the cavity face of the other die section.

One of the problems faced by those concerned with the need for thermoplastic injection-molded parts has always been the availability of such parts sufficiently early to enable physical testing, appearance evaluation, and fitting of the molded part with mating parts. In order to obtain a prototype of the part in the specified material it is necessary to fabricate prototype molds. Such molds are usually machined from metal castings or the like. While the machining of such molds enabled the production of satisfactory parts, such machining is costly from the standpoint of both time and expense.

It is an object of the present invention to provide a method of forming molds or dies for plastic injection molding and the like which involves little or no machining but which at the same time utilizes a cast metal body having sufficient strength to withstand the pressure of injection molding.

The invention further contemplates the method of making molds having a cast metal body, the cavity therein being faced with a cast resin layer bonded to the metal body and providing an extremely accurate cast surface for faithfully reproducing a model of the part to be molded.

Other objects and features of the present invention will become apparent from the following description and drawings in which:

FIG. 5 shows the step of lining the cavity of the completed female die section with a layer of material corresponding to the wall thickness of the part to be molded and incorporating thereon ribs, bosses, lifters, etc. to be incorporated in the cavity of the finished male die section.

FIG. 6 is a sectional view showing the die as prepared in FIG. 5 utilized for forming a plaster pattern of the male die section.

FIG. 7 is a cross section of the completed die showing the resin layer cast on the face of the male die.

FIG. 8 is a fragmentary sectional view showing a part injection molded in the resin faced cavity formed by assembling the finished male and female die sections.

Figure 1:
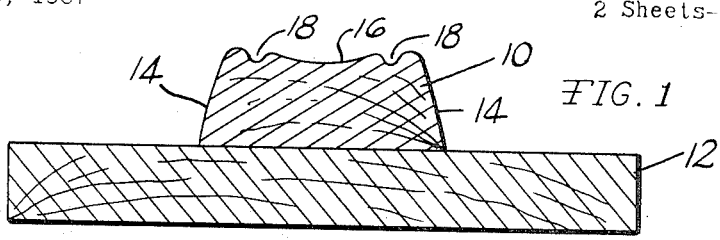
FIG. 1 shows the first step of the present method involving the use of a model which is fashioned to represent the outer surface contour of the part to be molded.

In practicing the method of the present invention there is initially formed a model of the part to be injection molded, the model being fashioned of wood or any other suitable material as an accurate reproduction of the outside of the part to be molded. A cross section of the model is shown in FIG. 1 and the model is designated 10. As a matter of convenience model 10 is mounted on a base 12. In making model 10 the shrinkage of the plastic material from which the part is to be molded is taken into consideration. It is known, for example, that acrylonitrile-butadiene-styrene (A.B.S.) plastics shrink about .005" per inch, acrylic resin about .004" per inch, polyethylene and polypropylene .020" per inch, etc. The model 10 is built the same as a production die model of the part to be molded. The model must be very accurate in its size and shape and must have the surface finish desired in the mold since the method of this invention reproduces the model surface very exactly. The model 10 illustrated simply by way of example has sloping side walls 14 and a concave top wall 16 having a pair of grooves 18 therein. This configuration of the part to be molded is representative of a workpiece of rather simple configuration; however, the method of the present invention is applicable for forming dies for workpieces of most any configuration.

Figure 2:
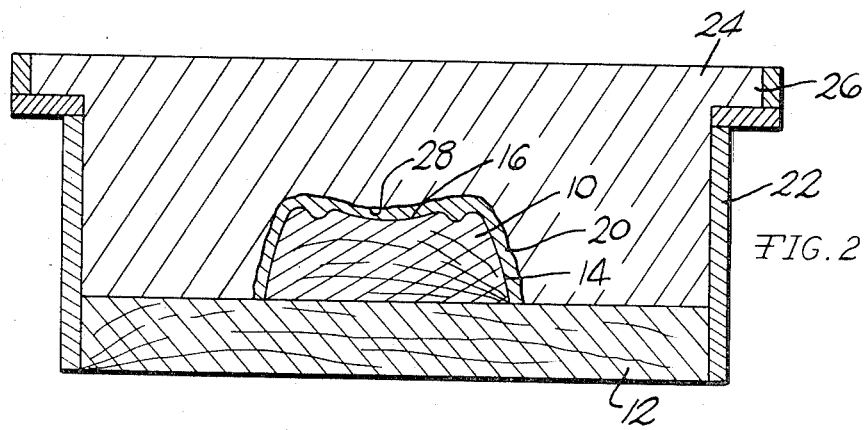
FIG. 2 shows the casting of a plaster pattern from the model illustrated in FIG. 1.
Figure 3:
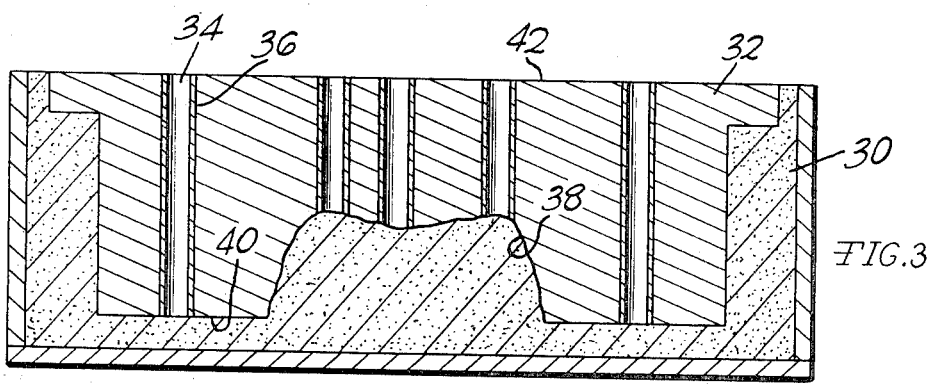
FIG. 3 is a cross sectional view of the female half of the die body cast from a sand mold made from the plaster pattern illustrated in FIG. 2.

A coating of wax and/or clay, etc. is then applied to the entire exterior surface of the model 10. This coating is designated 20 in FIG. 2. The purpose of this coating is to allow room for the plastic facing material in the finished die and also to compensate for the metal shrinkage in the metal base or body which is to be cast. In FIG. 2 the coating 20 is illustrated as having a more or less uniform thickness. For reasons which will become apparent as the description proceeds the coating 20 may be made substantially thicker at some surface portions of model 10 that at others. A framework 22 is built around model 10 and its base 12 from wood or other suitable material and in this framework a plaster pattern 24 is cast over the model using commercial pattern plaster material. In the arrangement shown in FIG. 2 the plaster pattern 24 is formed with flanges 26 which can eventually serve as the clamping flanges on the finished die for holding it in a press. Any pockets for incorporating an injector system or lifters and/or slides that may be required in the female die section are incorporated in the plaster pattern at this time. It will be noted that the cavity 28 formed in plaster pattern 24 is oversized relative to the model 10 by the thickness of coating 20 on the model.

Plaster pattern 24 is then utilized as a foundry pattern for making a sand mold 30 into which a molten metal is adapted to be cast for forming a cast metal base or body 32 of the female die section. The metal used for casting base 32 may be of any type but is preferably one of the metals conventionally used for making temporary dies such as Kirksite or an aluminum alloy. These metals have a relatively low melting temperature and possess sufficient strength to withstand the molding pressure required in a die for molding prototype parts. A series of passageways 34 are formed in the base 32. These passageways may be drilled through the metal casting or can be formed during the casting of base 32 by inserting tubing or pipe 36 in the sand mold. Except for the passageways 34, base 32 has a configuration the same as plaster pattern 24. Base 32 will, however, be slightly smaller than pattern 24 because of the metal shrinkage which occurs during solidification. Thus, the cavity 38 in base 32 has the same shape as, but is slightly smaller than, the cavity 28 in pattern 24. Cavity 38 is, however, larger than model 10.

The surfaces of cast base 32 are then thoroughly cleaned of impurities and sand blasted to prepare a rough clean surface. At this time the mounting face 42 may be machined flat. Parting line face 40 and cavity 38 are then cleaned with a suitable solvent such as methylene chloride so as to insure that these faces are free of all oil, grease or other impurities. If desired, acid etching or caustic soda etching of these surfaces may be employed to insure an absolutely clean surface for bonding of the later applied plastic to these surfaces of the metal base.

Figure 4:
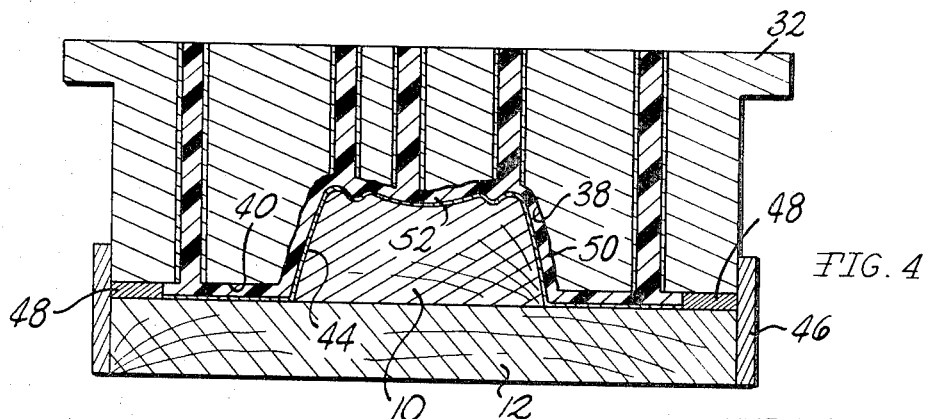
FIG. 4 shows the step of casting a resin facing on the female die section.

The coating 20 is then removed from model 10 and a release or parting agent 44 is applied to model 10 and the upper face of base 12. Any conventional release or parting agent may be employed. In FIG. 4 the layer of parting agent is illustrated highly exaggerated in thickness only for purposes of illustration. The sides of base 12 are then boxed in with a suitable frame 46 and the metal base 32 is lowered onto base 12 with model 10 projecting into cavity 38. Several spacers 48 are employed between the face 40 of base 32 and the top face of base 12 so that the parting line face 40 of base 32 is spaced slightly above the top face of base 12.

When the spacer material 20 is originally applied to model 10 as shown in FIG. 2, it may be applied as a layer of generally uniform thickness as mentioned previously or it may be applied so that when the mold base 32 is assembled on base 12 with spacers 48 as shown in FIG. 4 the space 50 between the cavity 38 in mold 32 and the surface of model 10 is of generally uniform thickness. Thus, comparing the arrangement illustrated in FIG. 2 with that shown in FIG. 4, if it is desired that the space 50 be of uniform thickness, then because of the geometry of the particular model 10 illustrated, the coating 20 on the upper face 16 of the model should be applied as a thinner layer than the coating 20 on the side walls 14 of the model.

After cast base 32 is assembled with model 10 as shown in FIG. 4, an epoxy casting resin is poured slowly into the passageways 34 of the cast metal base 32 so as to fill the space 50 with resin. The liquid epoxy resin completely fills the space 50, and preferably passageways 34, and is permitted to set or cure at room temperature for a sufficient period of time, 6 to 10 hours, so that for all practical purposes it provides a hard resin face on mold base 32. The resin layer is designated 52 in FIG. 4. After the resin layer has set it presents a mold cavity which reproduces in contour and finish the exact contour, features and finish on the model. The mold is then machined flat and parallel to the base.

After model 10 is removed from mold section 32 a layer of wax 54 or other lining material is applied to the resin faced, cavity-forming surface 56 of mold section 32, the thickness of the lining 54 corresponds to the wall thickness of the part to be molded. Thereafter suitable solid forms, such as shown at 58 and 60, are incorporated in or on the wax layer 54 so as to provide the required bosses, ribs, etc. on the inner surface of the part to be molded. In the arrangement shown in FIG. 5 the member 58 corresponds to a boss and the member 60 corresponds to a grooved rib. These members may be made of wood, plastic or metal, as is desired. In this connection it will be appreciated that the forming of such members individually and applying them to the wax layer 54 as illustrated represents a considerable savings in cost as compared with machining these ribs and bosses directly into the metal mold cavity. At the same time any lifters or ejectors required in the male mold section, such as shown at 62, are applied to the wax layer 54.

After the mold section 32 is built up in the manner illustrated in FIG. 5, a layer 64 of spacer material such as wax and/or clay and the like is applied to the wax layer 54 and over the forms 58, 60 and the lifters 62. A wood frame 66 is then built around the mold and a plaster pattern 68 is cast therein as shown in FIG. 6. At this time any pocket such as illustrated at 70 that may be required in the male die for accommodating an ejector system is formed in the plaster pattern 68.

Pattern 68 is thereafter employed in the same manner as plaster pattern 24 illustrated in FIG. 2 for casting a male mold base 72. More specifically plaster pattern 68 is used for making a sand mold, not illustrated, from which is cast the metal base 72.

After the metal base of the male mold section is thoroughly cleaned and the spacer material 64 removed from the wax layer 54 a parting or release agent 74 (FIG. 7) is applied to the exposed face of the wax layer 54 and the parting face of the female mold section 32. Spacers 76 are arranged on the parting face of the mold base 32 and the cast male mold section 72 is thereafter placed on base 32 as shown in FIG. 7 so as to form a space 78 between the cavity-forming faces of base 72 and the face of mold plate 32 to which the parting agent 74 has been applied. The two mold sections are clamped together and liquid resin is poured into the passageways 80 in mold base 72 so as to fill the space 78 with a layer of resin designated 82 in FIG. 7. The resin is permitted to set or cure for a sufficient period of time so that it presents a relatively hard surface. The wax layer 54 is then stripped from the female mold section and both halves of the die are cleaned and polished as desired. Thereafter they are clamped together and oven heated at a temperature and for a period of time sufficient to completely cure the epoxy resin face coat on the two mold sections. After completely curing, the two mold sections are treated as a conventional mold and ejector pins, sprue bushings, etc. are added where required to complete the mold.

After the necessary runners, etc. are formed in the two mold sections, they can be re-assembled as shown in FIG. 8 for injection molding of the prototype part. In FIG. 8 the part being molded is designated by numeral 84. The shape, size and thickness of this part corresponds to the wax layer 54 together with the members 58, 60 which are applied thereto as shown in FIG. 5.

The method of forming dies according to the present invention presents several advantages over present-day conventional practice. Since the die base is formed of metal it has the necessary strength to withstand the injection molding pressure. The plastic face of the die reproduces very accurately the contour of the model. As pointed out above, inserts, special ejectors and the like can be cast in the die without tedious, lengthy and expensive machining operations which normally require "bluing-in" and fitting. The present method eliminates substantially entirely the machining, preparing, polishing, etc. normally required in a conventional metal die. At the same time a mold made in accordance with the present invention is much stronger than a die made entirely of epoxy resin. A mold made in accordance with the present invention also transfers heat at a much more rapid rate than a solid plastic die.

While the method herein disclosed is most admirably suited to the making of plastic injection molding dies, its use is not limited to the making of such dies. It may also be utilized for making forming dies, blow molding dies and other types of dies, such as dies for pre-forming, stretching and bending of various materials. Likewise, although the specific part illustrated has a mold parting line lying in a flat surface, the method of this invention effects even greater savings in time and expense when the mold parting line lies in an irregular surface. With an irregular parting line the method differs only in that the top face 12 around the periphery of model 10 defines an irregular surface rather than the flat surface illustrated.

I claim:

1. A method of making a set of male and female dies for forming the exterior and interior surface of a workpiece, such as by injection molding, which comprises, forming a model to the exterior contour and size of the workpiece, applying a layer of spacing material over the exterior surface of said model, casting a first pattern therefrom having a cavity which corresponds in size and shape to the model with the layer of spacing material thereon, casting a male pattern from said first pattern, casting a metal female die section from said male pattern, said female die section having a cavity therein which is slightly larger than the workpiece, applying to the outer surface of the model a layer of parting compound, assemblying the model and the female die section such as to provide a space between the external surface of the model and the cavity wall surface of the die section, pouring fluid epoxy resin between the model and the die section to fill said space therebetween, said resin when set being adapted to bond to the cavity forming surface of said die section, causing said resin to set and thereby form in the die section a hard resin faced cavity which is an accurate reproduction of the external surface of said model, removing the model from said die section, applying to said resin faced cavity a layer of spacing material thicker than the desired wall section of the part to be formed, casting a first pattern therefrom having a projecting portion smaller than said cavity, casting a female pattern from said first pattern, casting a male die section from said female pattern, said male die section having a portion thereon adapted to project into said resin faced cavity when the die sections are assembled and which is smaller than said resin faced cavity by an amount slightly greater than the desired wall thickness of the workpiece, lining said resin faced cavity with a layer of material having a thickness corresponding to the desired wall thickness of the workpiece to be formed, said lining material being of the type which temporarily adheres to the resin facing of the cavity in the female die section and is inert to said fluid epoxy resin, assemblying said male and female die sections with said portions of the male die section projecting into said lined resin faced cavity of the female die section so that the outer surface of said projecting portion of the male die section is spaced from the lining on said resin faced cavity, pouring a fluid epoxy resin between said die sections to fill said last-mentioned space, said resin when set being adapted to bond to said projecting portion of said male die section, causing said resin to set and thereby provide on said projecting portion of said male die section a hard resin surface which defines the inner wall surface of the workpiece to be formed and thereafter stripping said lining of spacer material from said resin faced cavity.

2. The method called for in claim 1 wherein said layers of spacing material applied to said model and said resin faced cavity have a thickness on the order of about one-quarter of an inch.

3. The method called for in claim 1 wherein forms of solid material are applied to the cavity of the female die section prior to molding said pattern so as to form on said projecting portion of the male die section cavities which correspond to the ribs, bosses and the like desired on the inside of the workpiece.

4. The method called for in claim 1 wherein said model is formed with a base, said base being provided with a flat laterally outwardly extending peripheral surface portion which defines the parting line on the workpiece to be molded.

5. The method called for in claim 4 wherein said female die section is formed with a flat outwardly extending surface portion around the peripheral edge of the cavity therein, said female die section and said model being assembled so as to provide a space between said flat peripheral space portions of the model and female die sections for receiving said fluid resin.

6. The method called for in claim 5 wherein said male die section is formed with a flat laterally outwardly extending surface portion around the periphery of said projecting portion, said resin faced female die section and said male die section being assembled so as to provide a space between said flat peripheral surface portion of said male die section and said resin faced flat peripheral portion of said female die section for receiving said fluid resin.

References Cited

UNITED STATES PATENTS

| | | | |
|---|---|---|---|
| 3,101,065 | 8/1963 | Kalis | 264—226 |
| 3,188,370 | 6/1965 | Gotzy | 264—226 |
| 3,239,590 | 3/1966 | Trimble | 264—226 |
| 3,408,436 | 10/1968 | Cubitt | 264—225 |

JULIUS FROME, Primary Examiner

H. MINTZ, Assistant Examiner

U.S. Cl. X.R.

164—91; 264—220, 225, 226.

PO-1050
(5/69)

UNITED STATES PATENT OFFICE
CERTIFICATE OF CORRECTION

Patent No. 3,548,050      Dated December 15, 1970

Inventor(s) MOZER, Rudolf W.

It is certified that error appears in the above-identified patent and that said Letters Patent are hereby corrected as shown below:

Column 5, Line 15 - After 'workpiece,' insert
-- removing said layer of spacing material
from said model, --

SIGNED AND
SEALED
MAR 9 1971

(SEAL)
Attest:

Edward M. Fletcher, Jr.
Attesting Officer

WILLIAM E. SCHUYLER, JR.
Commissioner of Patents